United States Patent Office 2,810,401
Patented Oct. 22, 1957

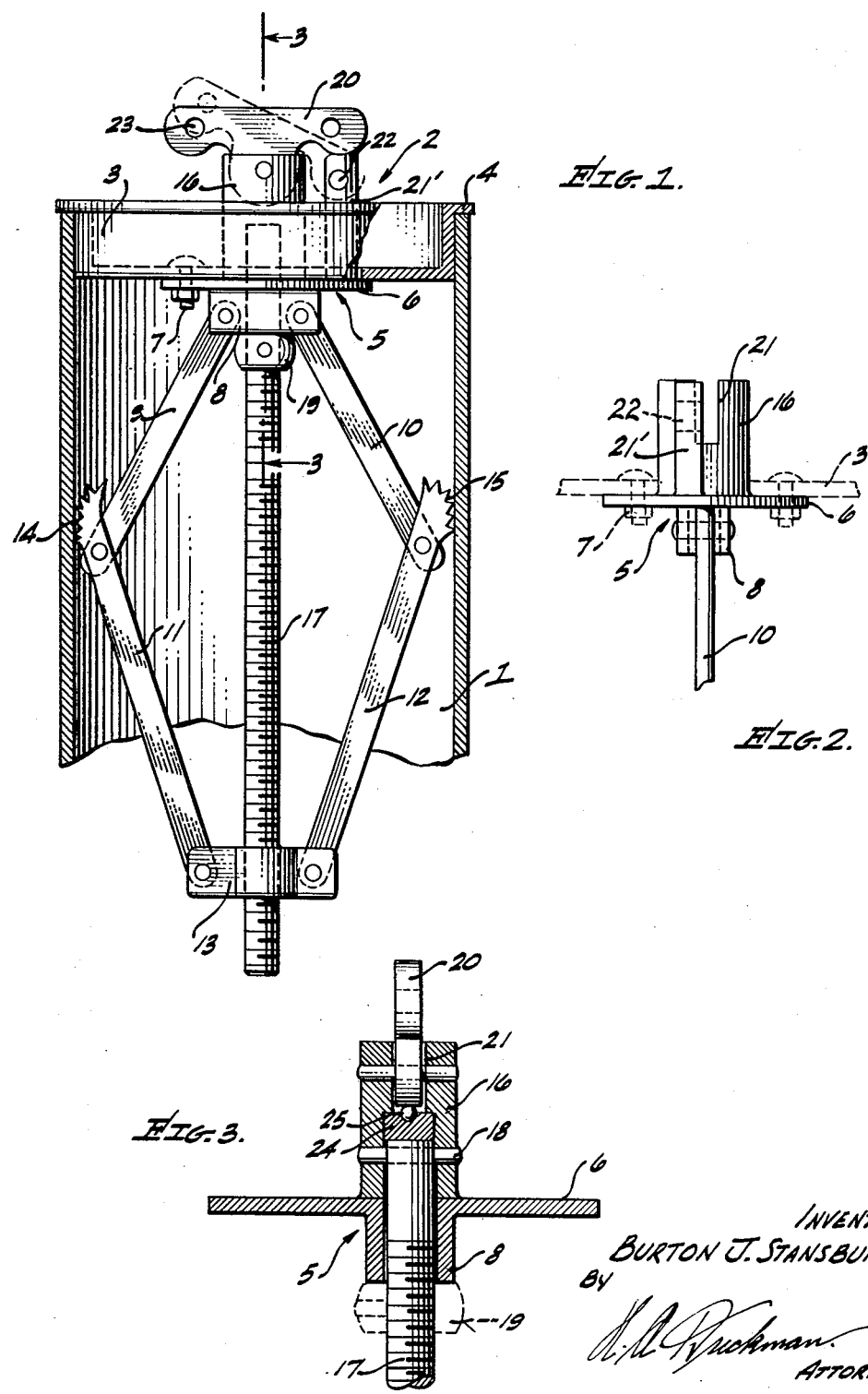

2,810,401
DETACHABLE PIPE CLOSURE
Burton J. Stansbury, Bakersfield, Calif.
Application February 17, 1955, Serial No. 488,742
1 Claim. (Cl. 138—89)

This invention relates to a detachable pipe closure, particularly for pipe lines which, under construction, are of necessity left open at night since the pipe line can seldom be completely installed and buried in a single working day. Since the pipe line is incompleted it is necessary to close the open end of the pipe to prevent children, animals, and the like, from crawling into the pipe.

The purpose of my invention is to provide a novel detachable pipe closure which can be so mounted in a section of pipe that the end thereof will be effectively closed, and which cannot be removed by unauthorized persons.

Another object of my invention is to provide a novel detachable pipe closure which can be locked when mounted in a pipe so that unauthorized persons cannot remove the pipe closure and enter the pipe.

Still another object of my invention is to provide a novel pipe closure in which the pipe engaged members of the closure are so actuated that pipes of various sizes can be readily engaged, requiring only the change in the cap or end member of the closure to fit various sizes of pipe.

Still another object of my invention is to provide a novel pipe closure which is simple in construction, inexpensive to manufacture and effective in use.

Other objects, advantages and features of invention may appear from the accompanying drawing, the subjoined detailed description and the appended claim.

In the drawing:

Figure 1 is a side elevation of my pipe closure in position in a pipe, and with parts broken away to show interior construction.

Figure 2 is a fragmentary side elevation of the plate and link portion.

Figure 3 is a fragmentary vertical sectional view taken on line 3—3 of Figure 1.

Referring more particularly to the drawing, the numeral 1 indicates a section of pipe which may be either a casing which is placed vertically in the ground, or a portion of a pipe line which is substantially horizontal and is usually buried in a trench. To exclude playing children and animals it is necessary to close the end of the pipe 1 during the nighttime, or when the workmen are not around. For this purpose I provide a detachable closure 2, which includes a cap or closure member 3, preferably formed as a shallow cup. A flange 4 on one end of the cup 3 engages the end of the pipe 1, substantially as shown. The cup 3 fits the pipe 1 and this cup or closure can be changed to fit different pipe sizes, as will be subsequently described. A fitting 5 consists of a plate 6 which is bolted onto the bottom of the cup 3 by means of the bolts 7, or similar fasteners. A pair of flanges 8 depend from the plate 6 and are so spaced that they will receive the links 9 and 10 therebetween and enable these links to be pivotally secured to the flanges. A second pair of links 11—12 are pivotally secured at one end to the links 9—10, respectively, and the lower ends of these links are pivotally secured to a rider 13. The links 11 and 12 are each formed with teeth 14 and 15, respectively, which are cut on the links and engage the inside of the pipe 1, as shown in Figure 1.

A sleeve 16 rests on the top of the plate 6 and is centrally positioned thereon, subsequently as shown. A threaded post 17 extends between the flanges 8 and thence through the plate 6 and is fastened to the sleeve 16 by a pin 18 or the like. The post 17 is threaded throughout approximately its entire length, and the rider 13 is threaded onto this post. Thus as the post 17 is rotated manually, the rider 13 will move up or down, depending upon the direction of the rotation of the post 17. Thus the arms 11 and 12 will be swung either outwardly or inwardly to engage or disengage the pipe 1 with the teeth 14 and 15. A stop washer 19 is attached to the post 17 and bears against the bottom of the flanges 8. Thus the post 17 is held against vertical movement in the fitting 5, enabling the linkage 9, 10, 11 and 12 to function properly when engaging or disengaging the pipe 1. A key 20 is pivotally secured to the sleeve 16 and is preferably mounted in a slot 21 in the sleeve. The key or handle 20 is used when manually rotating the sleeve 16 for the purpose of moving the links 9, 10, 11 and 12, for the purpose of engaging or disengaging the teeth 14—15 with the pipe 1. A post 21' is secured to the top of the plate 6 and this post is provided with a hole 22 which matches with one of the holes 23 in the key 20 whenever the key is tilted downwardly, as shown in dotted lines in Figure 1.

When the holes 22—23 are aligned the bow of a padlock can be passed through the holes, thus preventing the key 20 from being rotated or tampered with by unauthorized persons. A rubber pad 24 rests on top of the post 17 and a ball 25, embedded in the pad 24, bears against the bottom of the key 20 to frictionally hold this key in either a straight or a tilted position.

In operation, the rider 13 is so positioned on the threaded post 17 that the teeth 14—15 on the links 11—12, respectively, will readily pass into the pipe 1. The closure or cup 3 then fits into the end of the pipe 1 and the flange 4 bears against the pipe. The key 20 is now rotated, which rotates the sleeve 16 and the threaded post 17. The rider 13 now moves upwardly on the post 17 and the links 11 and 12 are tilted outwardly so that the teeth 14 and 15 thereon will be tightly pressed against the inside of the pipe 1, and will thus hold the closure 3 securely in position. The key 20 can be locked against the post 20' by passing the bow of a padlock through the holes 22—23, thus securely mounting the closure 3 within the pipe 1 and preventing its removal by any unauthorized person.

Having described my invention, I claim:

A detachable pipe closure comprising a cap adapted and arranged to fit over and within the end of a pipe, said cap being cup shaped and fitting closely within the end of a pipe, said cap also including a peripheral flange projecting outwardly therefrom and engaging the end of the pipe, a fitting fixedly secured to said cap and within the cup portion thereof, a threaded post journaled in said fitting, a rider threaded onto the post, a pair of links pivotally mounted at one end thereof on said fitting, a second pair of links each pivotally attached at one end thereof to one of the first named links, the other end of each of said last named links being pivotally attached to said rider, pipe engaging teeth on the ends of each of said last named links which teeth engage the pipe, and means mounted on the upper end of said threaded post whereby the post may be manually rotated, said last named means including a sleeve attached to the upper end of the threaded post.

References Cited in the file of this patent
UNITED STATES PATENTS

| 135,822 | LaForge | Feb. 11, 1873 |
|---|---|---|
| 1,115,534 | Heafer et al. | Nov. 3, 1914 |
| 1,370,585 | Hawthorne | Mar. 8, 1921 |
| 1,560,280 | Martin | Nov. 3, 1925 |
| 2,339,455 | Britton | Jan. 18, 1944 |
| 2,512,169 | Nachtigal | June 20, 1950 |
| 2,670,799 | Dobbs | Mar. 2, 1954 |